(12) United States Patent
Miller et al.

(10) Patent No.: US 7,909,148 B1
(45) Date of Patent: Mar. 22, 2011

(54) COMBINATION FOOD COOLER AND TABLE ASSEMBLY

(76) Inventors: Larry D. Miller, Loveland, CO (US);
Karen C. Miller, Loveland, CO (US)

( * ) Notice: Subject to any disclaimer, the term of this patent is extended or adjusted under 35 U.S.C. 154(b) by 65 days.

(21) Appl. No.: 12/586,889

(22) Filed: Sep. 29, 2009

(51) Int. Cl.
*A45F 3/00* (2006.01)
*B62B 3/02* (2006.01)

(52) U.S. Cl. ......... 190/11; 280/47.26; 280/30; 190/12 A

(58) Field of Classification Search ............... 190/11, 190/12 A; 280/30, 47.26
See application file for complete search history.

(56) References Cited

U.S. PATENT DOCUMENTS

| | | | |
|---|---|---|---|
| 592,159 A * | 10/1897 | Miller | 190/35 |
| 1,022,158 A * | 4/1912 | Simonsen | 190/11 |
| 4,436,353 A * | 3/1984 | Tucker | 312/241 |
| 4,581,902 A | 4/1986 | Starck et al. | 62/258 |
| D368,387 S | 4/1996 | Bureau | D6/397 |
| 5,833,333 A * | 11/1998 | Brown | 312/235.1 |
| D429,606 S | 8/2000 | Israel et al. | |
| 6,213,265 B1 * | 4/2001 | Wang | 190/11 |
| 6,311,991 B1 | 11/2001 | Conrado et al. | 280/47.26 |
| 6,328,179 B1 * | 12/2001 | Conrado et al. | 220/592.2 |
| 6,536,733 B1 | 3/2003 | Sharp | 248/519 |
| 6,554,012 B2 | 4/2003 | Patarra | 135/16 |
| 6,796,319 B1 | 9/2004 | Patarra et al. | 135/16 |
| 6,925,944 B1 | 8/2005 | Miller et al. | 108/115 |
| 7,334,802 B2 | 2/2008 | Kaplan | 280/47.26 |
| 2007/0158156 A1 * | 7/2007 | Chen | 190/11 |

OTHER PUBLICATIONS 2-page advertisement for Party Cart found Apr. 30, 2009 at website www.kangaroopouch.com.

* cited by examiner

*Primary Examiner* — Tri M Mai
(74) *Attorney, Agent, or Firm* — William E. Hein

(57) ABSTRACT

A combination food cooler and table assembly includes a cooler base having an insulated cavity covered by a removable lid and a table assembly overlying the cooler lid. A table sub-panel has two legs that slide within table leg sleeves at opposite ends of the cooler base. A table top mounted over the sub-panel includes a central panel and a pair of drop leaves hingedly attached to opposite sides of the central panel. A pair of handhold openings in the sub-panel, accessed through hinged covers at the ends of the central panel, permit the user to raise the table assembly to a desired height. The central panel is mounted atop the sub-panel by means of a swivel mechanism that permits the table top to be rotated about its central axis 90 degrees with respect to the sub-panel when the drop leaves are raised outwardly and upwardly from a vertical or transport position to a horizontal position. A locking handle/pawl mechanism associated with each of the table leg sleeves engages a selected one of a plurality of recessed notches in the table leg sleeves to thereby lock the table assembly in a raised position of desired height above the cooler base.

13 Claims, 5 Drawing Sheets

COMBINATION FOOD COOLER AND TABLE ASSEMBLY

BACKGROUND AND SUMMARY OF THE INVENTION

This invention relates generally to portable food cooler/table combinations and, more particularly, to a food cooler and table assembly combination that can be configured for use in a variety of applications, including those in a home, an office, a school, or a recreational vehicle, for example.

Food cooler/table combinations of various types are known in the prior art. For example, The Party Cart, marketed by Kanga-roo Pouch (www.kangaroopouch.com) purports to be a wheeled food cooler that converts into a picnic table by means of a pair of fold-out leaves hingedly attached to the side edges of the cooler lid. A folding camp chair is stowed on the underside of each of the leaves for use when the cooler is configured as a table. U.S. Pat. No. 4,581,902 is directed to a combination cooler and table in which a removable table top that normally overlies the cooler cover may be secured in a fixed position of use elevated above the cooler cover. U.S. Pat. No. 7,334,802 is directed to a combination wheeled cooler and retractable tray in which the tray may be moved between a stowed position and an elevated position above the cooler lid. U.S. Pat. No. 6,796,319 is directed to a wheeled cooler that includes a pop-up tray table on top of the cooler and an umbrella stand at the wheeled end of the cooler. U.S. Pat. No. 6,554,012 is directed to a wheeled cooler having openings in top and bottom panels thereof for receiving an umbrella mast that can be augured into the earth beneath the cooler for stabilization purposes. A table panel having a central mast opening engages the umbrella mast to maintain the table panel in a desired position above the top panel of the cooler. U.S. Pat. No. 6,536,733 is directed to a cooler with an integrated umbrella stand attached to one side of the cooler. U.S. Pat. No. 6,311,991 is directed to a wheeled cooler having a towing handle and a table assembly hinged coaxially with the cooler lid to permit the table assembly to be rotated to a deployed position, forward of the towing handle, independently of the cooler lid. U.S. Pat. No. Des. 368,387 is directed to a combined cooler and collapsible table, the cooler top having a hinged leaf on opposite sides thereof that may be rotated from a collapsed position to an open position that forms a table surface.

In accordance with the illustrated preferred embodiment of the present invention, a combination food cooler and table assembly includes a cooler base having an insulated cavity covered by a removable tethered lid and a table assembly overlying the cooler lid. The table assembly includes a rectangular table sub-panel having a downwardly protruding table leg at opposite ends thereof, each of the table legs being adapted for sliding engagement within a table leg sleeve provided at opposite ends of the cooler base. A table top mounted over the table sub-panel includes a rectangular central panel directly overlying the cooler lid and a pair of drop leaves hingedly attached to opposite sides of the central table panel. A pair of handhold openings provided in the table sub-panel permit the user to raise the table assembly to a desired height above the cooler lid. Access to the handhold openings is by way of a pair of hinged access covers provided at opposite ends of the central panel of the table top. The central panel is mounted over the table sub-panel by means of a swivel mechanism that permits the table top to be rotated about its central axis 90 degrees with respect to the table sub-panel when the drop leaves are lifted outwardly and upwardly from a vertical or transport position to a horizontal position. A locking handle/pawl mechanism associated with each of the table leg sleeves engages a selected one of a plurality of recessed locking notches in the table leg sleeves to thereby lock the table assembly in a raised position that is a desired height above the cooler lid and to also permit the user to lift and reposition the entire combination food cooler and table assembly. Two wheels are provided at the rear end of the cooler base, and a towing handle is provided at the front end thereof. The towing handle may be rotated from a lowered or stowed position to a limited raised position that facilitates towing of the combination food cooler and table assembly by a user without interference between the cooler and the user's legs. An opening in the central panel of the table top may be provided to receive an umbrella or flag pole.

DESCRIPTION OF THE PREFERRED EMBODIMENT

Figure 6:
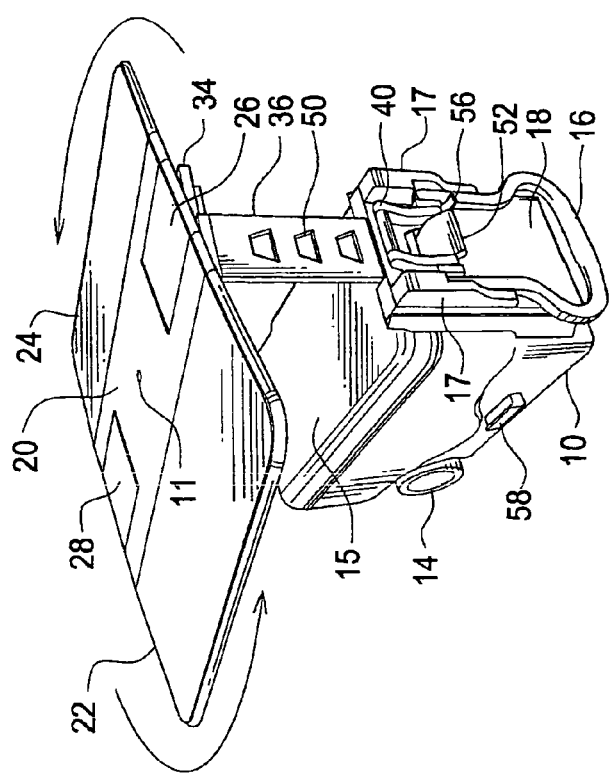
FIG. 6 is a front perspective view of the combination food cooler and table assembly of FIGS. 1-5, illustrating the table assembly locked in its highest position above the lid of the cooler, the drop leaves raised to their horizontal position, the table top fully rotated to its position of use, and an umbrella positioned in a receptacle in the table top.

Referring now to FIGS. 1-4, the combination food cooler and table assembly 100 of the present invention includes an insulated wheeled cooler 10 and a table 12 mounted above cooler 10. Cooler 10 includes a pair of wheels 14 mounted at the rear end thereof and a lid 15 that may be removed when table 12 is in a raised position. A tether of appropriate length may be connected between corresponding points on the bottom surface of lid 15 adjacent the ends thereof and corresponding points on the front and rear inside surfaces of the base of cooler 10 to allow lid 15, when removed, to hang on either the left or right side of cooler 10, thereby preventing contact between lid 15 and any contaminating surface. A centrally-located opening 11 in table 12 permits attachment of an umbrella or flag pole 13, as shown in FIG. 6. A pole block 63 is mounted on the underside of table 12 and serves to retain pole 13 in position in opening 11. When the combination food cooler and table assembly 100 is in the transport configuration shown in FIGS. 1 and 2, table 12 may be conveniently used as a seat. One or more removable trays having lip edges may be slidably retained on a peripheral rim within cooler 10 to hold items the user wishes to separate from other items contained in the base portion of cooler 10. A towing handle 16 is pivotally mounted on a front end panel 18 of cooler 10. Towing handle 16 is movable between a raised towing position illustrated in FIG. 1 and a depending stowed position illustrated in FIG. 2. Cutouts in a pair of towing handle mounting brackets 17 serve to engage towing handle 16 and to prevent it from being raised beyond a predetermined acute angle that will prevent interference between the cooler 10 and the user's legs when towing the combination food cooler and table assembly 100. Table 12 includes a rectangular central table panel 20 and a pair of drop leaves 22, 24 hingedly mounted to the longer left and right sides, respectively, of central table panel 20. When table 12 is in the lowered or transport configuration shown in FIGS. 1 and 2, drop leaves 22, 24 are retained within a leaf support 58 provided near the bottom of each of the left and right sides of cooler 10.

Front and rear cutout access covers 26, 28 are hingedly attached to central table panel 20 and are adapted to open upward to provide access to respective front and rear handhold openings 30, 32 provided in a table sub-panel 34 attached to the underside of central table panel 20. Handhold openings 30, 32 enable the user to lift table 12 into a raised position that is a desired height above cooler 10. Front and rear leg members 36, 38 of rectangular cross section are fixedly mounted to the underside of table sub-panel 34 at respective ends thereof, as may be seen by additional reference to FIGS. 5-10. Table leg members 36, 38 extend downwardly and are centrally positioned along the shorter front and rear edges of table sub-panel 34. The bottom ends of table leg members 36, 38 are inserted into two matingly-shaped sleeves 46 that are correspondingly positioned in front and rear end panels 18, 44 of cooler 10 such that table leg members 36, 38 are vertically slidable within the sleeves 46.

Figure 1:
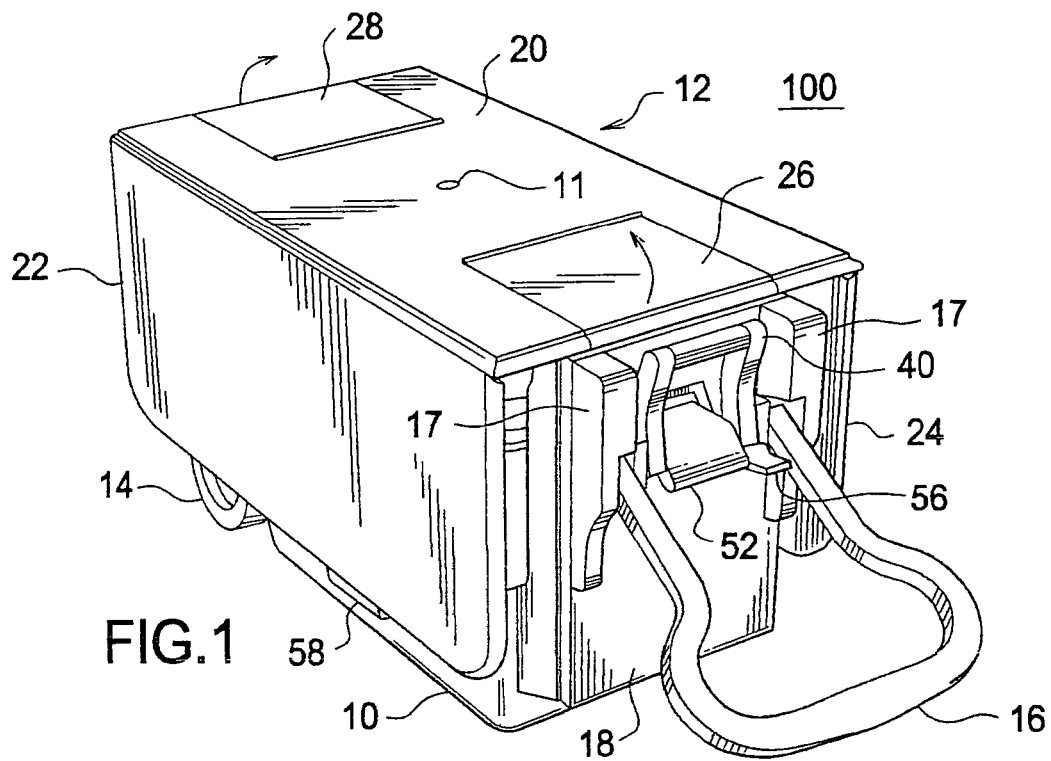
FIG. 1 is front perspective view of the combination food cooler and table assembly of the present invention, illustrating the towing handle in its towing position.
Figure 2:
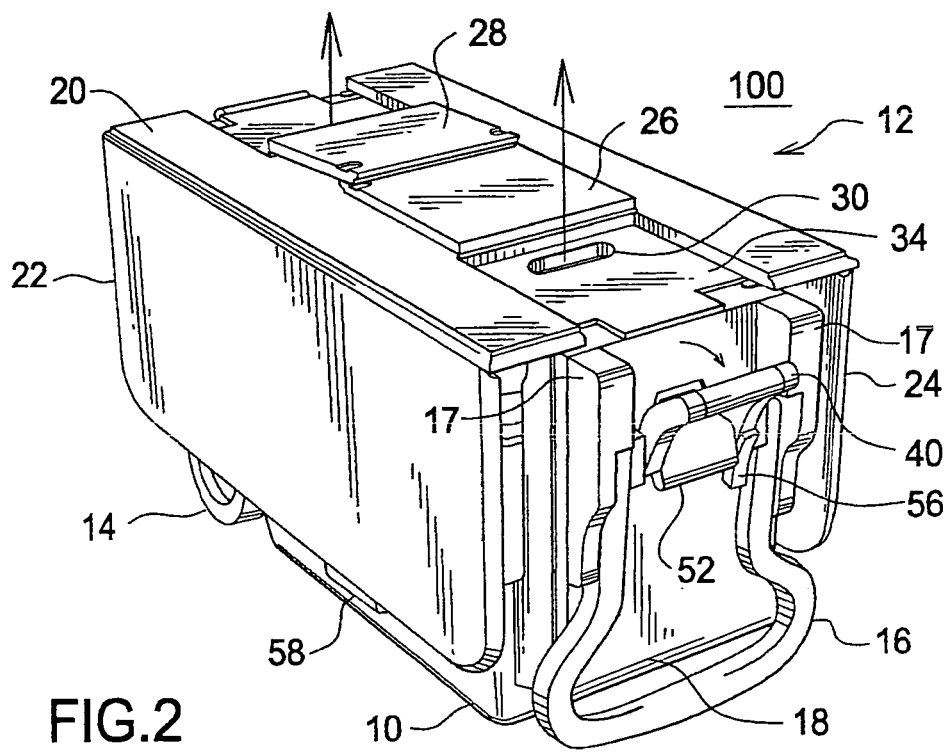
FIG. 2 is a front perspective view of the combination food cooler and table assembly of FIG. 1, illustrating the towing handle in its lowered or stowed position and a pair of hinged handhold covers in their open positions that permits access by the user to the table lifting handholds.
Figure 4:
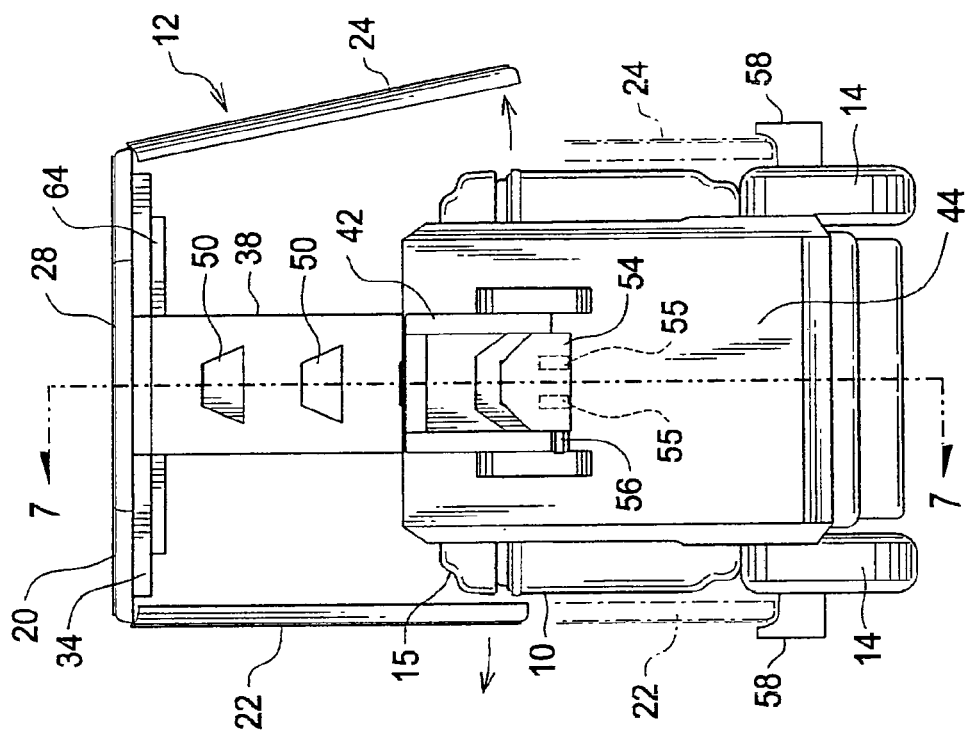
FIG. 4 is a rear elevation view of the combination food cooler and table assembly of FIGS. 1-3, illustrating the table assembly being lifted past an intermediate position toward its highest position above the lid of the cooler and the drop leaves being raised outward and upward toward the horizontal position.
Figure 3:
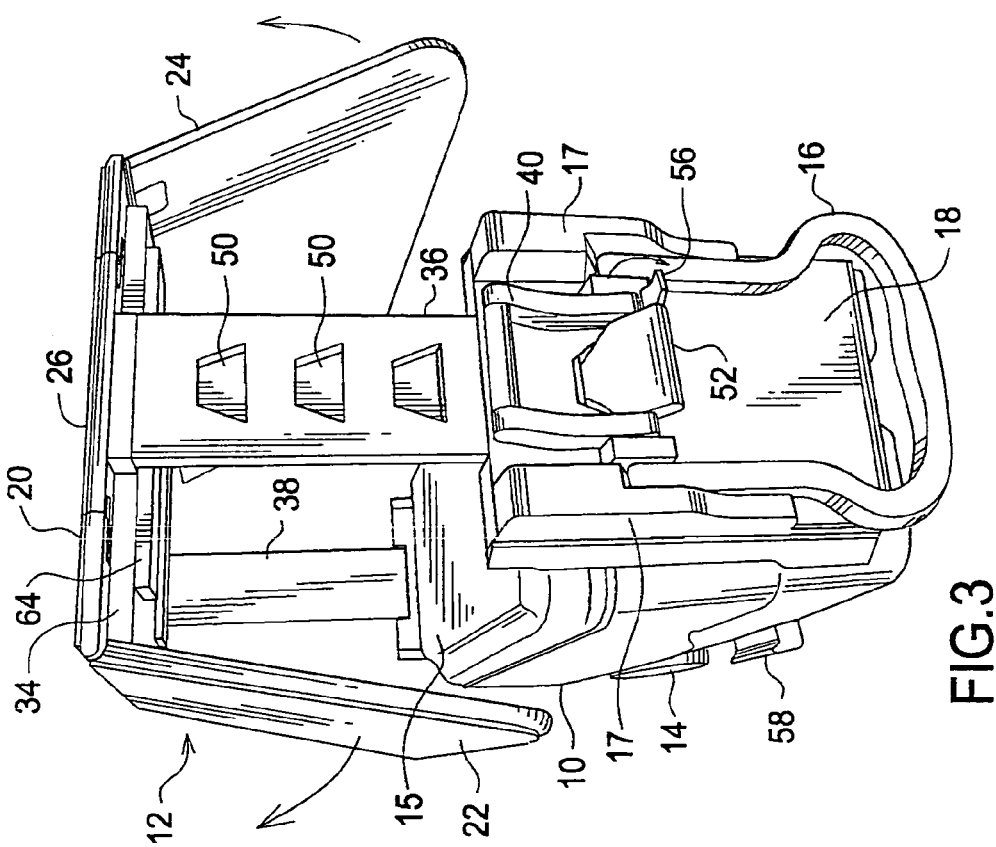
FIG. 3 is a front perspective view of the combination food cooler and table assembly of FIGS. 1 and 2, illustrating the table assembly locked in its highest position above the lid of the cooler and a pair of drop leaves of the table top being raised outward and upward toward a horizontal position.
Figure 5:
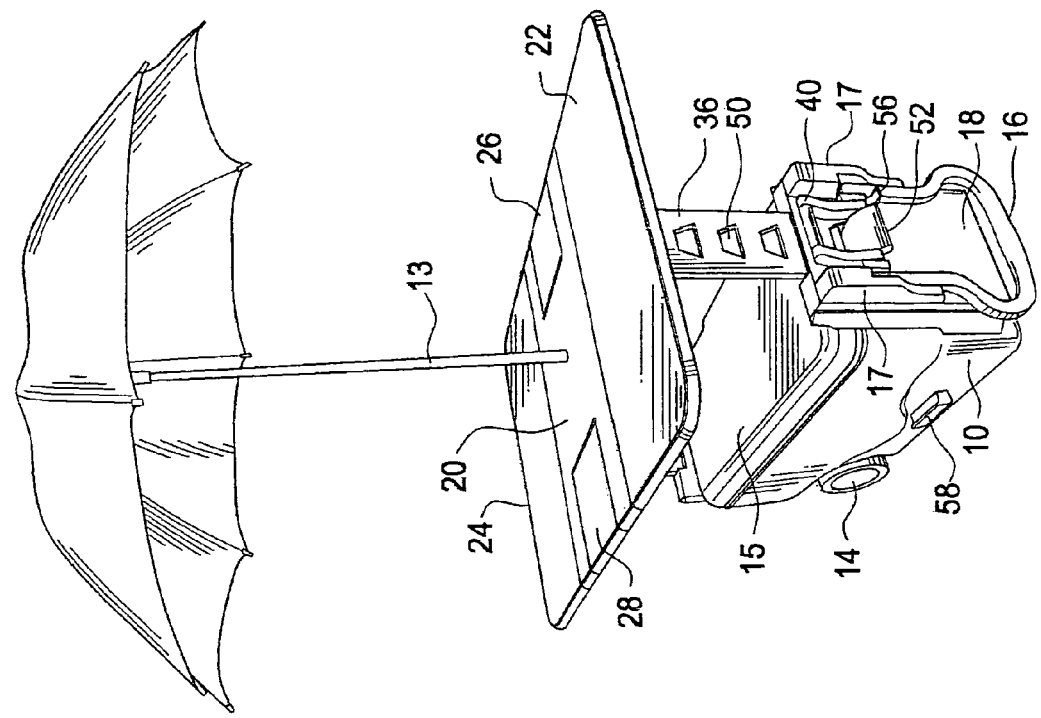
FIG. 5 is a front perspective view of the combination food cooler and table assembly of FIGS. 1-4, illustrating the table assembly locked in its highest position above the lid of the cooler, the drop leaves raised to their horizontal position, and the entire table top partially rotated toward a position of use that is 90 degrees from its stowed position shown in FIGS. 1 and 2.

Central table panel 20 is rotationally attached to table sub-panel 34 by means of two fasteners 60 that are aligned parallel to and spaced equidistantly from front and rear edges of table sub-panel 34. Fasteners 60 are also spaced equidistantly from respective ones of left and right edges of table sub-panel 34. Fasteners 60 may comprise conventional bolts or lag screws inserted from the underside of table sub-panel 34 and into central table panel 20, for example. A pair of end spacer blocks 64 and a pair of side spacer blocks 66 prevent contact between the downwardly-protruding ends of fasteners 60 and lid 15 of cooler 10 when table 12 is in the lowered or transport position illustrated in FIGS. 1 and 2. Fasteners 60 reside within two opposing 90-degree arcuate openings 62 provided in table sub-panel 34, the arcuate openings 62 having a coincident center that is also coincident with the center of table sub-panel 34. The foregoing arrangement permits 90 degrees of rotation of central table panel 20, as well as drop leaves 22, 24, when they have been lifted to the horizontal position, with respect to table sub-panel 34. Thus, table 12 may first be lifted from its transport configuration illustrated in FIGS. 1 and 2 to the raised position shown in FIGS. 3 and 4. Drop leaves 22, 24 are then raised to their horizontal position as illustrated in FIG. 5, followed by rotation of table panel 20 and drop leaves 22, 24, as also illustrated in FIG. 5, to the fully rotated position of use shown in FIG. 6. Drop leaves 22, 24 are supported horizontally in the configuration of FIG. 6 by the underlying front and rear ends of table sub-panel 34. When table 12 is in the position shown in FIG. 6, access covers 26, 28 may be opened to allow the user to conveniently access lid 15 and to view and insert or remove items from the cooler 10.

Figures 7, 8:
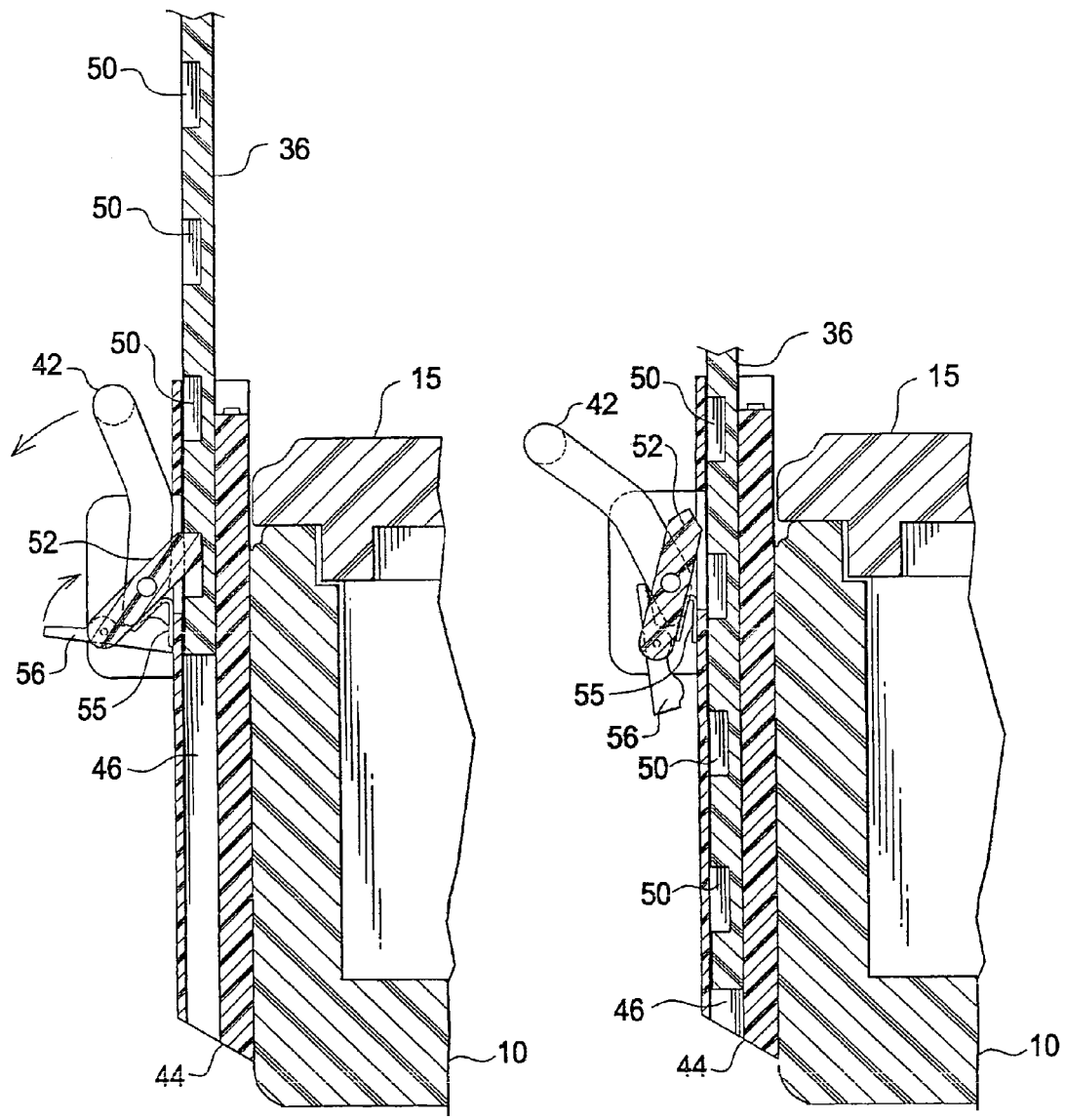
FIG. 7 is a cross-sectional view taken along the section line 7-7 of FIG. 4, illustrating a locking pawl mechanism in the locked position required to maintain the table assembly in its highest position above the lid of the cooler, as shown in FIG. 6.
FIG. 8 is a cross-sectional view taken along the section line 7-7 of FIG. 4, illustrating the locking pawl mechanism of FIG. 7 in the unlocked position that permits the user to lower the table assembly to its stowed position.
Figure 9:
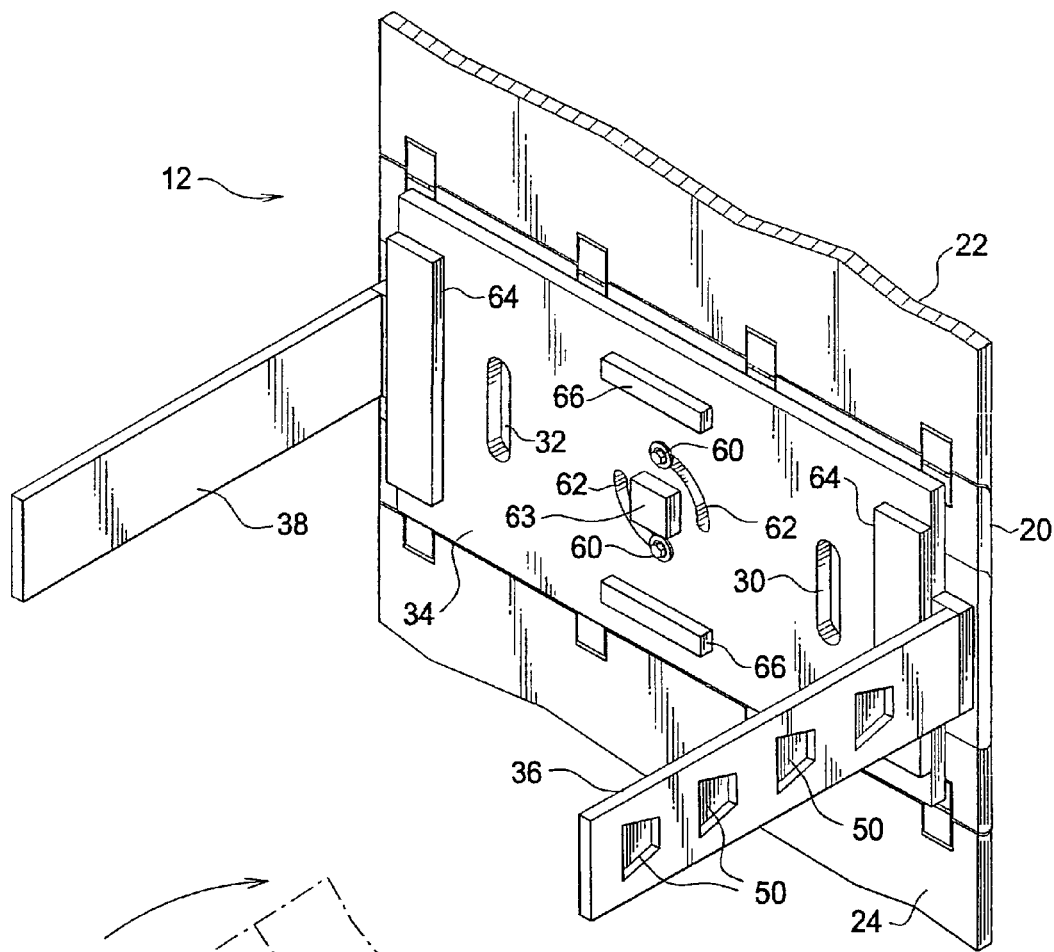
FIG. 9 is perspective view of the underside of a portion of the table assembly of FIGS. 1-6.
Figure 10:
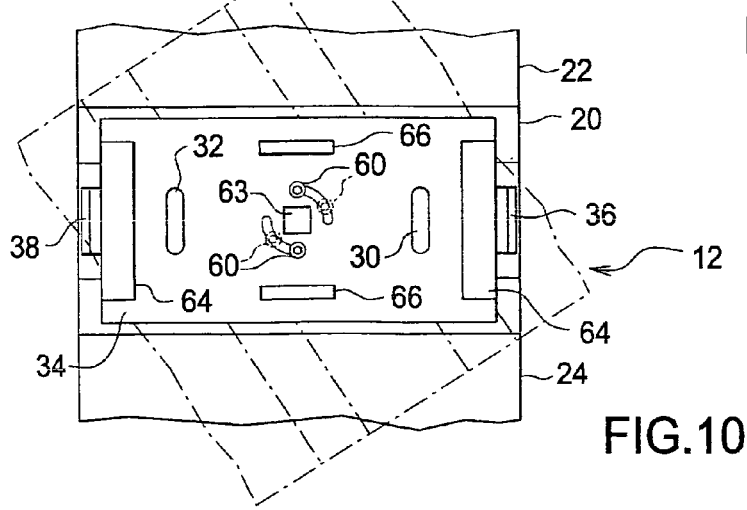
FIG. 10 is a bottom plan view of the portion of the table assembly of FIG. 9, illustrating, in phantom, the table top partially rotated from its transport position shown in FIG. 1 to its position of use shown in FIG. 6.

An outwardly-curved front locking handle 40 is permanently pivotally mounted in an upright position on front panel 18 in axial alignment with towing handle 16. A similarly-shaped rear locking handle 42 is permanently pivotally mounted in an upright position on the rear end panel 44 in a position corresponding to that of front locking handle 40. Locking handles 40, 42 permit the user to pick up the entire combination food cooler and table assembly 100. Multiple equally-spaced and vertically-aligned recessed trapezoidal notches 50 are provided on the outwardly facing surface of each of the table leg members 36, 38. A spring-loaded pawl 52 is associated, and moves in concert with, front locking handle 40. A second spring-loaded pawl 54 is associated, and moves in concert with, rear locking handle 42. Spring loading of pawls 52, 54 may be accomplished by any of a number of conventional means, such as one or more leaf springs 55 positioned between each of pawls 52, 54 and front and rear end panels 18, 44, respectively, of cooler 10. Spring-loaded pawls 52, 54 each have an inwardly-protruding end for engaging the notches 50 when table 12 is lifted into a raised position above cooler 10, as illustrated in FIGS. 5 and 6. As table 12 is lifted via the handhold openings 30, 32, locking handles 40, 42 and their associated pawls 52, 54 are pivoted outwardly against the force of their spring loading as each of the notches 50 passes the inward ends of the pawls 52, 54. When table 12 has been lifted to a desired height, the spring-loading force of pawls 52, 54 forces the inward ends thereof into the then adjacent ones of notches 50. The inward ends of pawls 52, 54 are shaped to form a 90-degree angle so as to precisely mate with the 90-degree angle at which the horizontal top and vertical inner surfaces of the notches 50 meet, as illustrated in FIG. 7. A safety lever 56 is pivotally mounted on one side of each of the pawls 52, 54 and is movable between an engaged position illustrated in FIGS. 4 and 7 and a disengaged position illustrated in FIG. 8. When table 12 has been raised to a desired height, the outward curvature of locking handles 40, 42 provides a space for the user's fingers, thus allowing them to be removed without disengaging the pawls 52, 54. In the engaged position, outward pivoting of locking handles 40, 42 is inhibited, which also inhibits unlocking of pawls 52, 54 from the selected ones of table leg notches 50. Accidental dropping of table 12 from its raised position is thus prevented. When safety levers 56 are pivoted to the disengaged position of FIG. 8, locking handles 40, 42 and their associated pawls 52, 54 are free to be pivoted outwardly, thereby permitting table 12 to be lowered from its raised position illustrated in FIGS. 3-7 or raised from its lowered position illustrated in FIGS. 1, 2, and 8.

We claim:

1. A combination food cooler and table assembly comprising:
   a generally rectangular cooler having a storage cavity formed by front and rear end panels, left and right side panels, and a lid, said cooler having a pair of rectangular table leg sleeves correspondingly positioned within each of said front and rear end panels;
   a table assembly positioned above said cooler, said table assembly comprising a rectangular table sub-panel having a pair of downwardly extending leg members fixedly mounted in corresponding positions proximate front and rear edges of said table sub-panel, said leg members being adapted for sliding engagement within respective ones of said table leg sleeves, each of said leg members having a plurality of equally-vertically-spaced recessed notches, correspondingly positioned in an outwardly-facing surface thereof said table sub-panel having front and rear handhold openings therein;
   said table assembly further comprising a rectangular central table panel having front and rear edges and left and right edges, said left and right edges being longer than said front and rear edges, said table assembly further comprising a pair of drop leaves hingedly attached to said left and right edges of said central table panel, said central table panel being rotatably attached on top of said table sub-panel so as to permit 90 degrees of rotation between a transport position of said table assembly, in which said pair of drop leaves are in a depending vertical position alongside said left and right side panels of said cooler, and a position of use in which said drop leaves have been lifted to their horizontal position, said drop leaves being supported in said position of use by front and rear end portions of said table sub-panel;
   said central table panel having front and rear hinged cutouts forming front and rear access covers, said front and rear access covers being adapted to open upwardly to provide access by a user to said front and rear handhold openings in order to permit said table assembly to be lifted from said transport position to a raised position that is a desired height above said cooler; and
   front and rear outwardly-curved locking handles pivotally mounted on said front and rear end panels, respectively, of said cooler, each of said front and rear locking handles having an inwardly-facing locking pawl portion that pivots in concert therewith, each of said locking pawls having an inwardly-protruding end for partially engaging successive ones of said notches in respective ones of said leg members of said table sub-panel as said table assembly is being lifted from said transport position to said raised position and for matingly engaging corresponding selected ones of said notches in respective ones of said leg members of said table sub-panel when said table assembly has been lifted to said raised position that is said desired height above said cooler.

2. A combination food cooler and table assembly as in claim 1, further comprising:
   a pair of transport wheels attached proximate a bottom end of said rear end panel of said cooler to facilitate towing of said combination food cooler and table assembly; and
   a towing handle pivotally mounted on said front panel of said cooler, said towing handle being mounted coaxially with said front locking handle and being arranged for movement between a depending stowed position and a raised towing position that is at a predetermined acute angle with respect to said front panel of said cooler, said predetermined acute angle serving to insure that the height of a front end of said cooler is sufficient to prevent interference between said front end of said cooler and a user's legs when said combination food cooler and table assembly is being towed.

3. A combination food cooler and table assembly as in claim 1, further comprising a safety lever pivotally mounted adjacent a selected side of each of said locking pawls and movable between an engaged position that prevents disengagement of an associated one of said locking pawls from the selected one of said notches with which it is matingly engaged when said table assembly has been lifted to said raised position that is said desired height above said cooler, and a disengaged position that permits disengagement of said associated one of said locking pawls from the selected one of said notches with which it is matingly engaged when said table assembly is in said raised position.

4. A combination food cooler and table assembly as in claim 1, further comprising a spring member positioned between each of said locking pawls and a respective one of each of said front and rear end panels of said cooler, said spring member urging an associated one of said locking pawls inwardly.

5. A combination food cooler and table assembly as in claim 1, further comprising:
   two 90-degree arcuate openings in said table sub-panel, said arcuate openings having a coincident center that is also coincident with a center of said table sub-panel; and
   a fastener resident within each of said two arcuate openings and serving to rotatably attach said central table panel to said table sub-panel.

6. A combination food cooler and table assembly as in claim 5, wherein said fasteners are aligned parallel to and spaced equidistantly from said front and rear edges of said table sub-panel, said fasteners also being spaced equidistantly from respective ones of left and right edges of said table sub-panel.

7. A combination food cooler and table assembly as in claim 5, wherein each of said fasteners comprises a bolt inserted from an underside of said table sub-panel.

8. A combination food cooler and table assembly as in claim 5, wherein each of said fasteners comprises a lag screw inserted from an underside of said table sub-panel.

9. A combination food cooler and table assembly as in claim 1, further comprising a leaf support provided proximate a lower end of each of said left and right side panels of said cooler for retaining a lower end of respective ones of said drop leaves when said table assembly is in said transport position.

10. A combination food cooler and table assembly as in claim 1, further comprising a plurality of spacer blocks mounted to the underside of said table sub-panel for supporting said table assembly on said lid when said table assembly is in said transport position.

11. A combination food cooler and table assembly as in claim 1, wherein said central table panel is provided with a central opening therein for receiving a selected pole-mounted accessory.

12. A combination food cooler and table assembly as in claim 11, wherein said pole-mounted accessory comprises an umbrella.

13. A combination food cooler and table assembly as in claim 1, further comprising hinge means connecting each of said front and rear cutouts of said central table panel to a remaining portion of said central table panel, said hinge means being positioned equidistantly inwardly from said front and rear edges of said central table panel and oriented such that an axis of rotation of each of said front and rear cutouts of said central table panel is parallel to said front and rear edges of said central table panel.

* * * * *